March 20, 1951     R. M. CRITCHFIELD ET AL     2,545,688

GENERATOR CONTROL SYSTEM

Original Filed Aug. 22, 1946

INVENTORS
ROBERT M. CRITCHFIELD
AND PAUL L. SCHNEIDER

BY *Spencer Hardman & Fehr* their ATTORNEYS

Patented Mar. 20, 1951

2,545,688

UNITED STATES PATENT OFFICE 2,545,688

GENERATOR CONTROL SYSTEM

Robert M. Critchfield and Paul L. Schneider, Anderson, Ind., assignors to General Motors Corporation, Detroit, Mich., a corporation of Delaware Original application August 22, 1946, Serial No. 692,352, now Patent No. 2,498,793, dated February 18, 1950. Divided and this application July 22, 1949, Serial No. 108,563

2 Claims. (Cl. 290—50)

This invention relates to control means for variable ratio drive to be used with automotive generators.

This application is a division of original application, Serial No. 692,352, filed August 22, 1946, now Patent No. 2,498,793, granted February 18, 1950.

The power required to operate an automotive generator varies with speed and with electrical output, the latter depending on the electrical load operating in the vehicle and the state of charge of the battery. When considering the application of an electromagnetic coupling to the generator drive so that the required drive ratio can be obtained at low engine speeds to secure adequate generator output and so that less drive ratio will be obtained at higher engine or car speeds in order to reduce stress on rotating parts and to reduce wear, particularly that of brushes and commutators, some means for controlling the slip of the coupling is necessary.

An object of the invention is to provide for the control of the slip of an electrical coupling in such manner that the required generator output will be obtained at low engine speeds while, in the higher speed range of the engine, the generator speed will not become excessive.

In the disclosed embodiment of the invention, the excitation of the energizing coil of the coupling is controlled in response to generator performance. The generator field and the coupling coil are connected in series and the current flowing therein is controlled by current and voltage regulators.

Further objects and advantages of the present invention will be apparent from the following description, reference being had to the accompanying drawings, wherein a preferred embodiment of the present invention is clearly shown.

Figure 1:
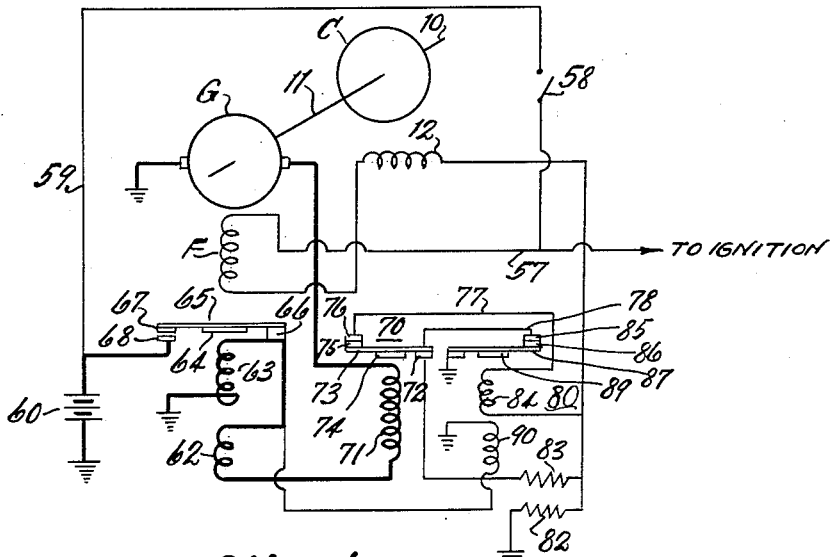
Fig. 1 is a wiring diagram of one embodiment of the invention.
Figure 2:
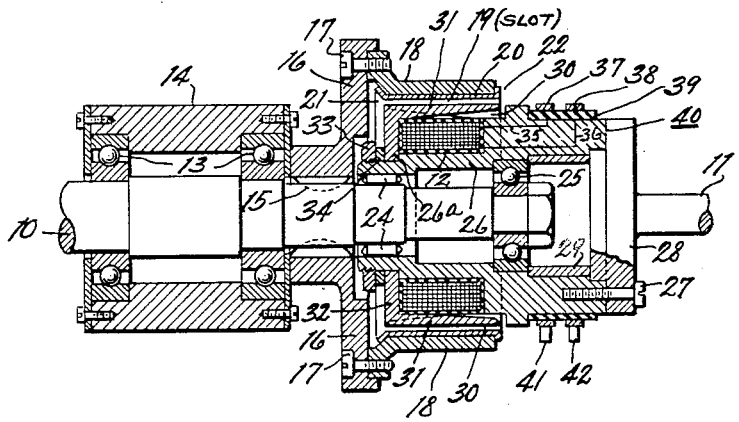
Fig. 2 is a longitudinal sectional view of a typical electro-magnetic coupling.

In Fig. 1, the line 10 designates an engine driven shaft. The circle C designates an electromagnetic coupling for connecting the shaft 10 with shaft 11 which drives generator G. The slip of coupling C is dependent upon the current flowing through the coupling coil 12. A form of electromagnetic coupling is disclosed in Fig. 2. Shaft 10 is journaled in bearings 13 supported by a bracket 14. To shaft 10 there is connected by a key 14 a plate 16 to which screws 17 attach a magnetizable shell or rotor 18, the interior surface of which is provided with a plurality of longitudinal extending grooves 19 equi-angularly spaced and each receiving a copper strap 20. The ends of all of the straps 20 are connected with rings 21 and 22 thus providing a squirrel cage rotor construction. The shaft 10 supports a pin bearing 24 and a ball bearing 25 upon which is journaled a magnetizable shaft 26 to which screws 27 attach a plate 28 connected to or integral with generator shaft 11. A spacer 29 located within the shaft 26 and retained by the plate 28 holds the bearing 25 in position within the shaft 26. Shaft 26 provides pole pieces 30 which are diametrically opposite and which are located between diametrically opposite pole pieces 31 extending from a plate 32 supported by the shaft 26, said shaft having a shoulder 26a against which the plate 32 is forced by the tightening of a nut 33 threadedly engaging the left end of the shaft 26 there being a washer 34 between the nut and the plate 32. The coupling field coil 12 of ring formation is supported by the shaft 26 and is embraced by the pole pieces 30 and 31 each of which has an angular span of slightly less than 90°. The pole pieces 30 will have polarity opposite to the polarity of the pole pieces 31. The coil 12 is connected by wires 35 and 36 with slip rings 37 and 38 insulatingly supported upon the shaft 36 by non-conducting sleeve 39. The rings 37 and 38 are engaged respectively by brushes 41 and 42. The coupling C (Fig. 2) therefore consists chiefly of a rotor 18 and a rotating field 40 and which includes the magnetizable shaft 26, the coupling field coil 12 and pole pieces 30 and 31 alternatively of opposite polarity each pole piece spanning circumferentially somewhat less than 90°. A coupling of this type is known as an electromagnetic coupling.

In the system shown in Fig. 1, the field coil F of the generator and the field coil 12 of the coupling are connected in series. The current through both windings is controlled by current regulator 70 and a voltage regulator 80, the operation of which causes a decrease in the current flowing through coils 12 and F as the speed of the generator increases and thereby reduces the speed range through which the generator must operate. The closing of switch 58 connects the battery charging line with wire 57 leading to field coil F, coupling field coil 12 and resistance 82 which is grounded. A control resistance 83 is connected with wire 81 and with terminal 72 of the current regulator. To terminal 72 there is fixed a spring blade 73 carrying an armature 74 cooperating with a core, not shown, which is surrounded by the coil 71. Blade 73 carries a contact 75 normally engaging a contact 76 connected by wire 77 with voltage regulator coil 84 connected with wire 81. Wire 78 leads from terminal 72 to voltage regulator contact 85 normally engaged by a contact 86 carried by a leaf spring blade 87 attached to a terminal 88 which is grounded. Blade 87 carries an armature 89 cooperating with a core (not shown) surrounded by coil 84 and also by a coil 90 which is grounded at one end and is connected at the other end with the battery charging line and is therefore responsive to generator voltage. Coil 84 is responsive to the current flowing through the generator field. The regulators 70 and 80 operate in the usual manner to control the current flowing through generator field coil F and coupling field coil 12. So long as the contacts of the regulators remain closed, the resistances 82 and 83 are by-passed to ground. When the current in coil 71 exceeds a certain value, the contacts of regulator 70 are separated so that the current flowing through the coils F and 12 is reduced by the resistances 82 and 83 in parallel. When the voltage in coil 90 exceeds a certain value, the contacts of voltage regulator 80 are separated and the resistance 83 is open circuited to reduce the current flow in these coils F' and 12. The current and voltage regulators operate to reduce the field current as the speed of the generator increases, and also to reduce the current in coupling coil 12 which reduces the speed range through which the generator must operate.

From the foregoing description of one embodiment thereof, it is apparent that the present invention provides means responsive to generator performance for controlling the excitation of the coupling coil. More specifically, the excitation of the coupling coil is controlled by current and voltage regulators.

In the present invention, the closing of the ignition control switch 58 prior to starting the engine connects the coupling coil with the battery so that even prior to closing of the cut-out relay contacts 67, 68 the coupling is ready to effect maximum coupling ratio between the engine and the generator whereby the generator voltage attained at low engine speed is sufficient for battery charging.

While the embodiment of the present invention as herein disclosed, constitutes a preferred form, it is to be understood that other forms might be adopted, all coming within the scope of the claims which follow.

What is claimed is as follows:

1. A generator speed-limiting control system for use on automotive vehicles and comprising a generator which is driven at varying speeds by the vehicle propelling engine, said generator having a shunt field winding, a storage battery charged by the generator, a generator-battery circuit including a relay for connecting the generator and battery when the generator is driven at a speed such that its voltage exceeds the counter-voltage of the battery and for disconnecting the battery from the generator when the generator speed is at such relative low value that the battery can discharge through the generator, an electromagnetic coupling normally connecting the engine with the generator at a drive ratio required for the closing of the relay and the charging of the battery at relatively low engine speeds, said coupling having an exciting coil and providing for coupling slip which is least when the energization of the coil is greatest and vice-versa, a circuit for connecting the coupling coil with the generator-battery circuit between the relay and the battery and including a manually operated switch and two normally by-passed current controlling resistances, each of the by-passes including a pair of normally closed contacts, an electromagnet responsive to generator current output for opening one of the pairs of contacts when output current exceeds a predetermined value and an electromagnet responsive to generator voltage for opening the other pair of contacts when generator voltage exceeds a predetermined value.

2. A generator speed-limiting control system for use on automotive vehicles and comprising a generator which is driven at varying speeds by the vehicle propelling engine, said generator having a shunt field winding, a storage battery charged by the generator, a generator-battery circuit including a relay for connecting the generator and battery when the generator is driven at a speed such that its voltage exceeds the countervoltage of the battery and for disconnecting the battery from the generator when the generator speed is at such relative low value that the battery can discharge through the generator, an electromagnetic coupling normally connecting the engine with the generator at a drive ratio required for the closing of the relay and the charging of the battery at relatively low engine speeds, said coupling having an exciting coil and providing for coupling slip which is least when the energization of the coil is greatest and vice-versa, a circuit for connecting the coupling coil with the generator-battery circuit between the relay and the battery and including a manually operated switch in series with the shunt field winding of the generator and with circuits in parallel comprising a first branch comprising, in series, two pairs of resistance by-passing contacts, and a second branch comprising a first resistance in parallel with one pair only of said pairs of contacts and a third branch comprising a second resistance in parallel with the other branches, an electromagnet responsive to generator current output for opening one of the pairs of contacts when output current exceeds a predetermined value and an electromagnet responsive to generator voltage and having a coil in the first branch for opening the other pair of contacts when generator voltage exceeds a predetermined value.

ROBERT M. CRITCHFIELD.
PAUL L. SCHNEIDER.

REFERENCES CITED

The following references are of record in the file of this patent:

UNITED STATES PATENTS

| Number | Name | Date |
|---|---|---|
| 1,124,736 | Heany | Jan. 12, 1915 |
| 1,246,056 | Conrad | Nov. 13, 1917 |
| 1,565,854 | Hasselbring, Jr. | Dec. 15, 1925 |
| 1,861,180 | Grob | May 31, 1932 |
| 2,097,483 | Weydell | Nov. 2, 1937 |
| 2,498,793 | Critchfield et al. | Feb. 28, 1950 |

FOREIGN PATENTS

| Number | Country | Date |
|---|---|---|
| 172,664 | Canada | June 2, 1916 |
| 466,978 | France | Mar. 20, 1914 |